United States Patent
Bolis et al.

(10) Patent No.: US 7,104,750 B2
(45) Date of Patent: **\*Sep. 12, 2006**

(54) FOGGING DEVICE FOR GAS TURBINES

(75) Inventors: Giacomo Bolis, Zurich (CH); Hans Ulrich Frutschi, Riniken (CH)

(73) Assignee: ALSTOM Technology Ltd., Baden (CH)

( * ) Notice: Subject to any disclaimer, the term of this patent is extended or adjusted under 35 U.S.C. 154(b) by 122 days.

This patent is subject to a terminal disclaimer.

(21) Appl. No.: 10/717,711

(22) Filed: Nov. 21, 2003

(65) Prior Publication Data

US 2004/0105755 A1     Jun. 3, 2004

(30) Foreign Application Priority Data

Nov. 25, 2002   (DE)   ................. 102 54 825

(51) Int. Cl.
 *F02C 7/143*   (2006.01)
 *F02C 7/24*    (2006.01)

(52) U.S. Cl. .................. 415/116; 415/1; 415/117; 415/119; 60/39.53; 181/214; 181/221; 181/222; 181/261; 239/426; 239/434; 239/590.5

(58) Field of Classification Search ............ 415/1, 415/116, 117, 119; 60/39.53, 728, 775; 239/14.1, 426, 433, 434, 590.5; 181/213–214, 181/220–222, 260–261
See application file for complete search history.

(56) References Cited

U.S. PATENT DOCUMENTS

| | | | |
|---|---|---|---|
| 2,749,998 A | 6/1956 | Walton et al. | |
| 2,869,670 A | 1/1959 | Hoffmann | |
| 2,974,482 A * | 3/1961 | Kelley | ................. 60/39.53 |
| 3,710,889 A * | 1/1973 | Lamy | ................. 415/119 |
| 3,785,625 A | 1/1974 | Engalitcheff, Jr. | |
| 3,839,846 A | 10/1974 | Teller | |
| 4,204,586 A | 5/1980 | Hani et al. | |
| 4,667,769 A | 5/1987 | Appel | |
| 4,773,846 A | 9/1988 | Munk | |
| 4,828,175 A * | 5/1989 | Heufler et al. | ............... 415/119 |
| 4,845,952 A | 7/1989 | Beebe | |
| 5,140,819 A | 8/1992 | Napier et al. | |
| 5,782,080 A * | 7/1998 | Illbruck | ................. 60/728 |
| 5,809,770 A * | 9/1998 | Jahn | ................. 415/119 |
| 5,867,977 A | 2/1999 | Zachary et al. | |
| 5,930,990 A | 8/1999 | Zachary et al. | |
| 6,027,305 A | 2/2000 | Ng et al. | |

(Continued)

FOREIGN PATENT DOCUMENTS

DE       696 07 471 T2      5/1998

(Continued)

OTHER PUBLICATIONS

Search Report from EP 03104186.6 (Jan. 29, 2004).

(Continued)

*Primary Examiner*—Christopher Verdier
(74) *Attorney, Agent, or Firm*—Cermak & Kenealy, LLP; Adam J. Cermak

(57) ABSTRACT

A fogging device (26) for introducing water and/or vapor into an intake air flow (10, 27) of a gas turbine (1–3) includes a sound-absorbing device (31, 35). This device may in particular be designed in the form of Venturi tubes (31), the water (29) being fed to the air flow (27) via nozzles (33) arranged at the narrowest location. In this way, the spraying of water for increasing the power output or for generally regulating the gas turbine can at the same time be combined with a silencer, and this in a comparatively simple construction.

12 Claims, 5 Drawing Sheets

U.S. PATENT DOCUMENTS

| | | | |
|---|---|---|---|
| 6,216,443 B1 | 4/2001 | Utamura | |
| 6,378,284 B1 | 4/2002 | Utamura | |
| 6,886,345 B1 * | 5/2005 | Ritland | 60/775 |
| 2001/0032477 A1 | 10/2001 | Schlom et al. | |
| 2004/0103667 A1 | 6/2004 | Frutschi | |

FOREIGN PATENT DOCUMENTS

| | | |
|---|---|---|
| DE | 199 13 681 A | 10/2000 |
| EP | 1 422 401 | 5/2004 |
| JP | 2000320835 A | 11/2000 |
| JP | 2000352320 | 12/2000 |
| WO | 99/44722 | 9/1999 |
| WO | 00/50739 | 8/2000 |

OTHER PUBLICATIONS

Search Report from DE 102 54 825.0 (Aug. 26, 2003).
Patent Abstracts of Japan, vol. 2000, No. 15 (Apr. 6, 2001) & JP 2000 352320 A (Nakamura Yoshihide) (Dec. 19, 2000).

* cited by examiner

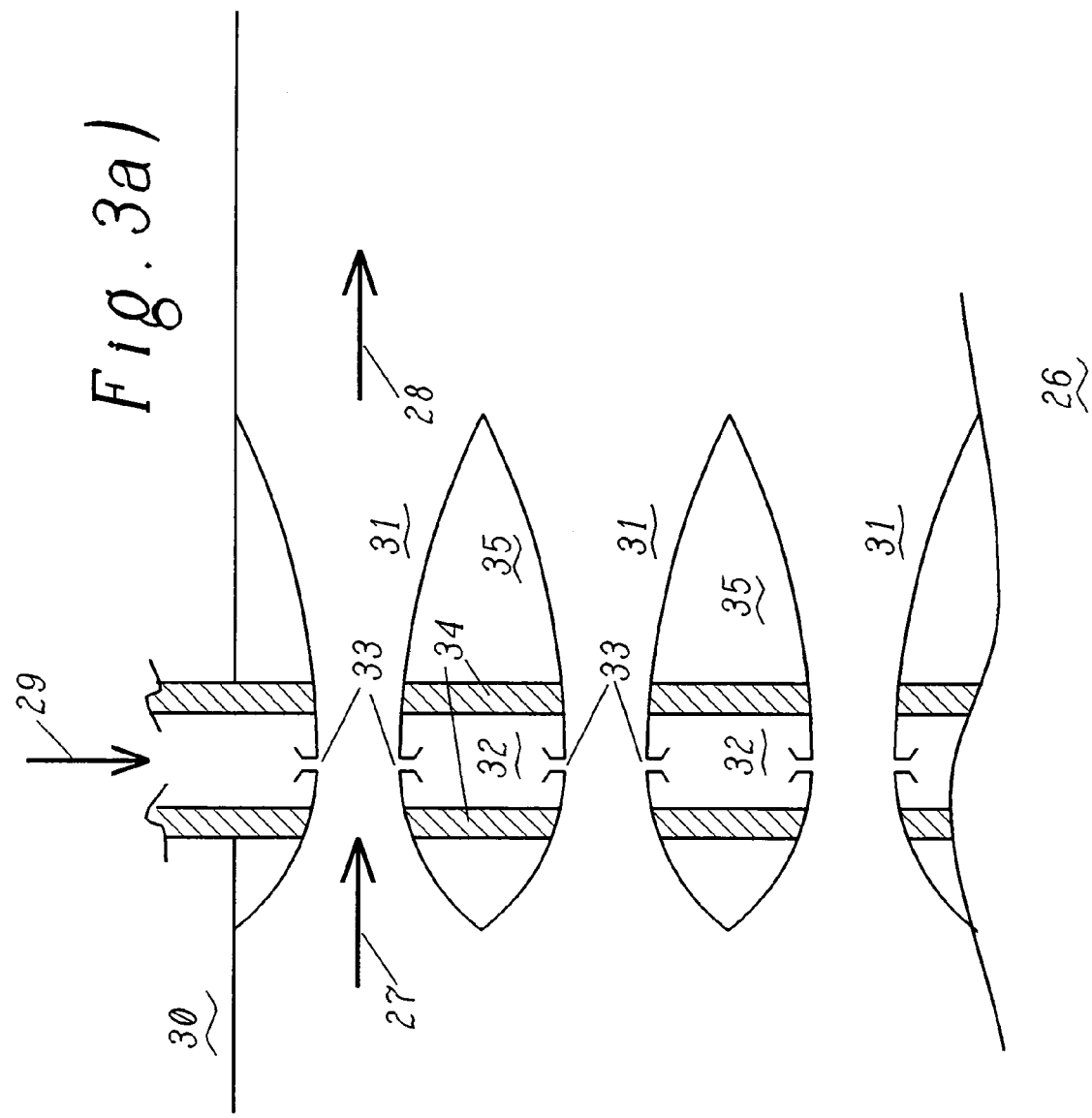

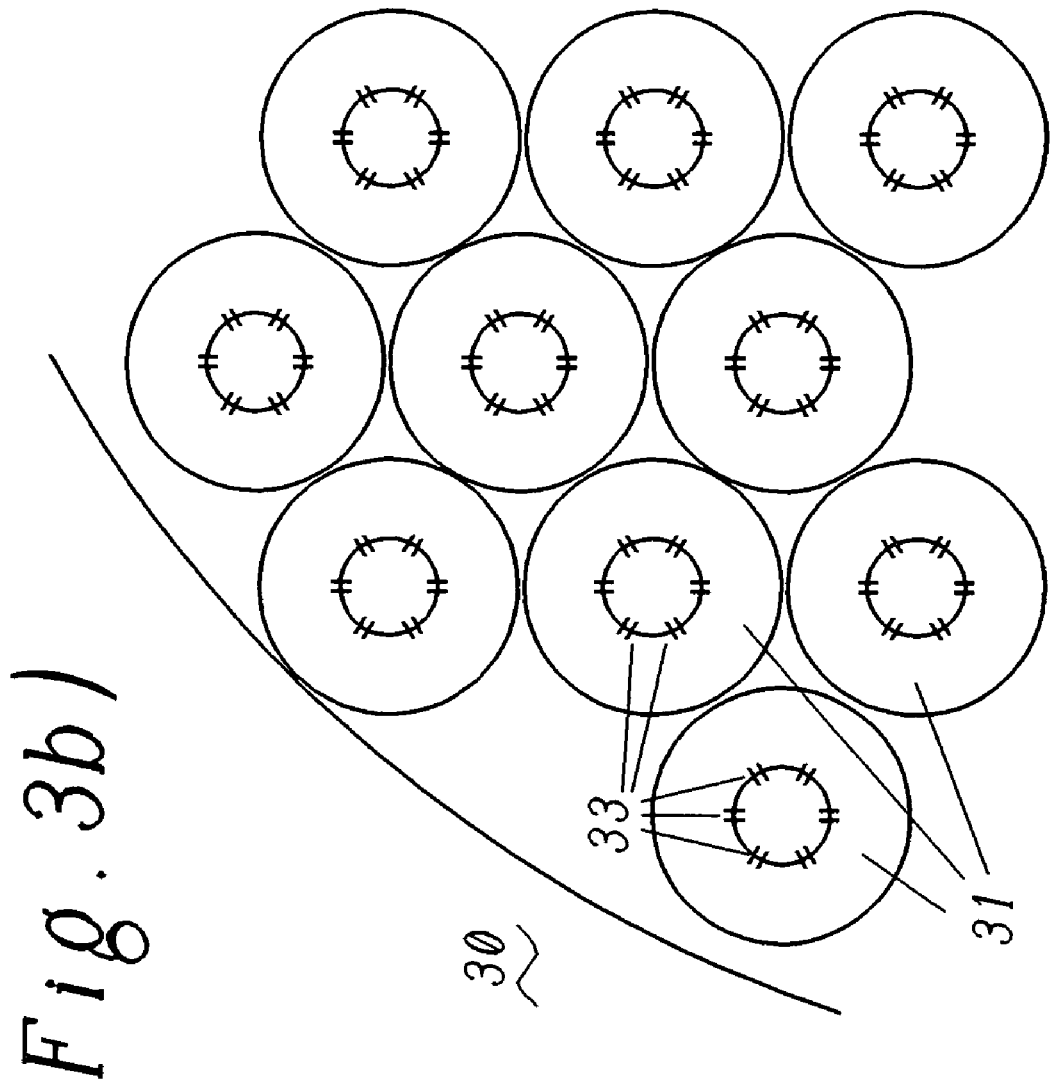

FOGGING DEVICE FOR GAS TURBINES

BACKGROUND OF THE INVENTION

1. Field of the Invention

The present invention relates to a fogging device for introducing water and/or vapor into an intake air flow of a gas turbine and to a method of increasing the power output of a gas turbine.

2. Discussion of Background

It is known that the feeding of water or vapor or other suitable liquids or mixtures of liquids into the working medium of a gas turbine can be used to increase the power output which can be produced by a gas turbine. On the one hand, the additional power output is made possible in this case by the cooling effect of fed water, this cooling effect allowing greater firing of the gas turbine. On the other hand, by the feeding of water or vapor, the mass flow which passes the turbine blades is increased, and thus the power output is also increased.

In this case, water can be fed either in the form of vapor, i.e. in the form of air wetting, or else in the form of small water droplets. In other words, water can be fed above the saturation limit. This technique, which is known as overfogging, is normally carried out by small liquid droplets of a certain size being fed to the air flow which is directed into the compressor (what is referred to as "wet compression"). This technique allows the available power output of the gas turbine"to be increased, since the work required for compressing the inlet air is reduced. This is due to the fact that the evaporation energy of the inlet air flow cools the latter when it passes the compressor stages.

There are a multiplicity of documents which describe this "wet compression" in connection with gas turbines. Thus, for example, U.S. Pat. No. 5,930,990 and its continuation-in-part, U.S. Pat. No. 5,867,977, both of which describe an apparatus and a method for increasing the power output of a gas turbine using wet compression. On the other hand, WO 00/50739 describes a special device for monitoring destructive wet compression, i.e. a device which monitors the gas turbine distortions occurring in this method and if need be correspondingly controls the feeding of water. Another document in this connection is U.S. Pat. No. 6,216,443, in which a device with which small liquid droplets are introduced into the inlet air flow of the compressor is likewise described, this introduction being effected between compressor and downstream of a silencer. The droplets which are fed to the air flow have in this case a specific droplet size of between 1 to 50 micrometers. Another publication from the same applicant, U.S. Pat. No. 6,378,284, the parent application for said U.S. Pat. No. 6,216,443, describes a gas turbine in which liquid droplets are added to the air flow upstream of the compressor, the liquid droplets at least partly evaporating before the inlet into the compressor and thus cooling the air flow and then completely evaporating in the compressor with further cooling of the air flow. In this case, the liquid droplets are introduced into the air flow downstream of an inlet plate having air slots, behind which an air filter or a silencer is normally also arranged.

SUMMARY OF THE INVENTION

Accordingly, one object of the invention is to provide a novel fogging device for introducing water and/or vapor into an intake air flow of a gas turbine. As already mentioned at the beginning, such fogging devices are used for increasing the power output of gas turbines, since the mass flow is increased and the temperatures reduced by their use, and thus greater firing at the same material loading is made possible.

This object is achieved in that the fogging device has sound-absorbing means.

The essence of the invention therefore does not consist in using, for example, a simple grid as fogging device, as is normal in the prior art, but rather in using a fogging device which is additionally able to reduce the high noise level produced in connection with the introduction of the inlet air into the compressor. Thus either the use of a further silencer in the inlet air flow can be completely dispensed with, or else it is possible to combine such a fogging device with an already existing silencer and thus further reduce the noise level. Surprisingly, in a simple construction, either a silencer can be dispensed with or else the noise level can be further reduced. Accordingly, such a fogging device is especially suitable in connection with the retrofitting of already existing plants.

Known silencers are normally designed in the form of packs of tubes arranged parallel to the air flow and next to one another. According to a first preferred embodiment of the present invention, the means are accordingly designed as a plurality of tubular elements arranged essentially parallel to the direction of flow of the intake air flow. It has surprisingly been found that such a sound-absorbing construction can be combined very effectively with the introduction of water and/or vapor or of small water droplets, and that even the droplet formation can be effected in a simplified manner by the flow conditions in such a tube construction. Furthermore, the sound-absorbing effect of such a construction can be improved by cavities between the elements being of sound-absorbing design. This is possible, for example, by either the tubular elements being provided with appropriate coatings or by these intermediate spaces being filled with special, sound-absorbing materials, e.g. foams.

According to a further preferred embodiment of the present invention, water (e.g. in the form of small droplets having a droplet size within the range of 10 to 50 μm) and/or vapor is introduced into the intake air flow via nozzles, the nozzles being arranged on the inside of the tubular elements and spraying water into the interior space. In this case, there are preferably at least two nozzles distributed over the circumference per element. Typically 4 nozzles, for example, are distributed over the circumference, in which case the nozzles may be arranged either offset in the direction of flow or else at the same level on one circumference in the direction of flow.

A further preferred embodiment of the present invention is characterized by the fact that the tubular elements have a variable diameter along their length. In other words, the tubular elements need not be cylindrical tubular elements, as is normally the case with silencers. The tubular elements preferably have a constriction in the center region, the constriction in particular being designed in such a way that the elements have essentially the same diameter on the inlet side and outlet side and in the center region have a diameter which is smaller by 20 to 30%. In other words, the tubular elements have a configuration like a Venturi tube. If such special tubular elements having at least one constriction are used, it is found that the introduction of water droplets into the air flow is assisted in an especially effective manner if the nozzles are arranged in the region of the constriction. In this case, the droplet formation is assisted by the increased flow velocity of the air flow in the region of the constriction, and accordingly the very complex and precise nozzles normally used for producing droplets of defined size can possibly be dispensed with, since the droplets are automatically broken up by the flow conditions.

Another preferred embodiment of the invention is characterized in that at least two supporting walls are arranged essentially perpendicularly to the direction of flow of the intake air flow, between which walls the water is fed and into which the tubular elements are admitted in such a way as to pass through the walls. This results in an especially robust construction, which in addition simplifies the feeding of water to the nozzles.

Furthermore, the present invention relates to a method of increasing or regulating the power output of a gas turbine using a fogging device as described further above. In this case, the fogging device is in particular preferably arranged in such a way that the water is sprayed into the intake air flow essentially directly upstream of a first compressor stage and/or of a second compressor stage and if need be downstream of a further silencer.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3a shows a section through a fogging device perpendicular to the air flow;

FIG. 3b shows a view parallel to the air flow of a fogging device according to FIG. 3a.

DESCRIPTION OF THE PREFERRED EMBODIMENTS

Figure 1:
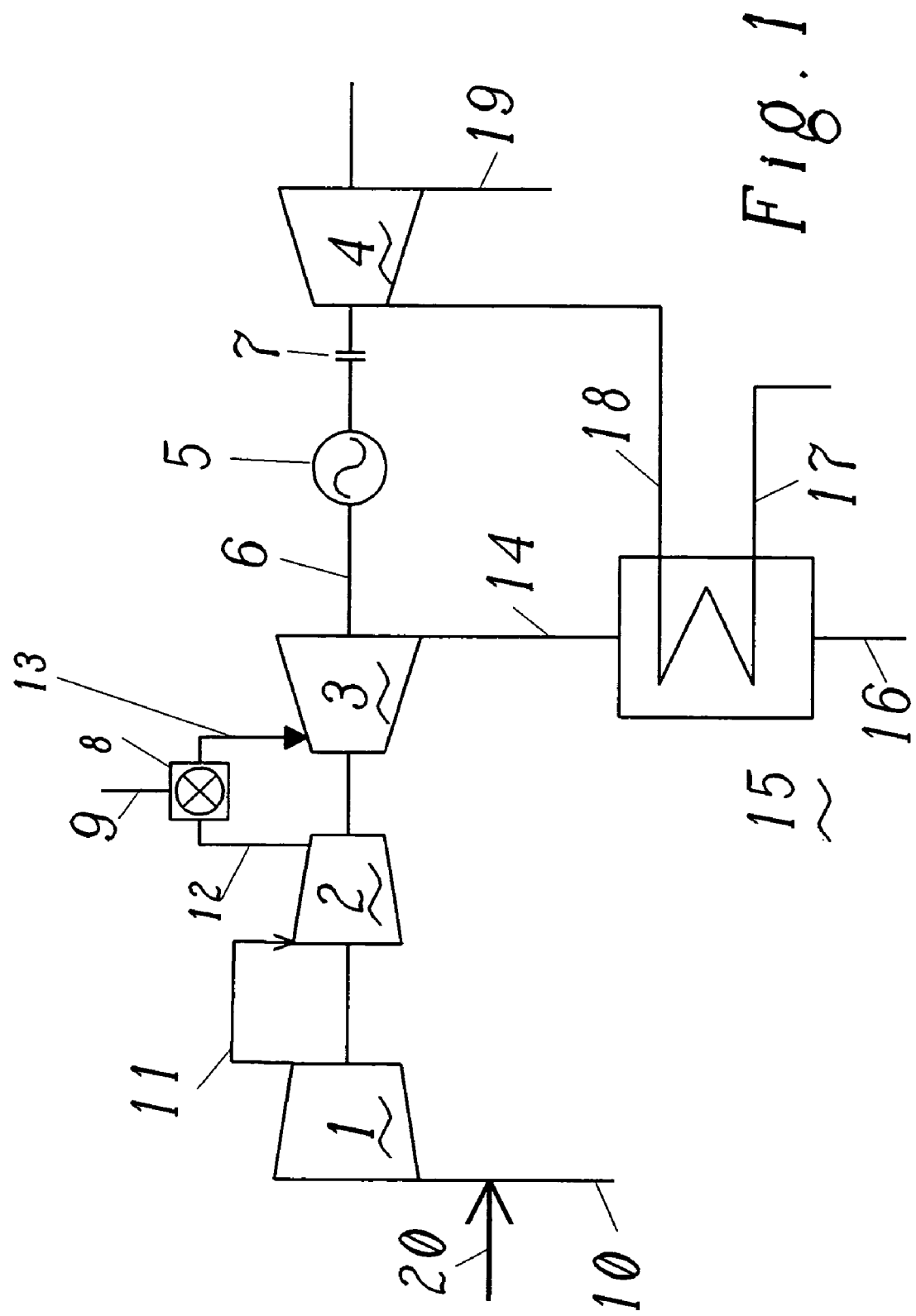
FIG. 1 shows a schematic representation of a gas turbine plant with two compressor stages.

Referring now to the drawings, wherein like reference numerals designate identical or corresponding parts throughout the several views, FIG. 1 shows a schematic representation of a gas turbine plant in which a fogging device according to the invention can be typically used. The plant has a first compressor stage 1, which brings the intake air 10 to a first pressure stage, and a second compressor stage 2, in which the partially compressed intake air flow 11 is increased to the final pressure stage. The fully compressed intake air 12 is then fed to a combustion chamber 8, in which fuel 9 is burned. The hot combustion gases 13 are directed to a gas turbine 3 and expanded therein, and the expanded, still hot gases 14 produced in the process are cooled down further in a heat recovery steam generator 15, arranged downstream of the gas turbine 3, and are only given off to the environment downstream of said heat recovery steam generator 15 via a chimney 16. The two compressor stages 1 and 2 and the gas turbine 3 are arranged on a common shaft 6, and this shaft 6 drives a generator 5. In the heat recovery steam generator 15, fed water 17 is heated in a possibly multi-stage process and evaporated, and the steam 18 generated is expanded in a steam turbine 4 for further generation of energy. The steam turbine 4 may either be connected to a separate generator or else, as shown in FIG. 1, may drive the same generator 5 via a coupling 7 on the same shaft 6.

To increase the power output, water 20 in droplet form is now fed to the intake air flow 10 via a fogging device. It is shown in FIG. 1 how water is fed upstream of the first compressor stage 1; however, it is possible, as an alternative or additionally, to also introduce water into the path of the partially compressed intake air 11.

Figure 2:
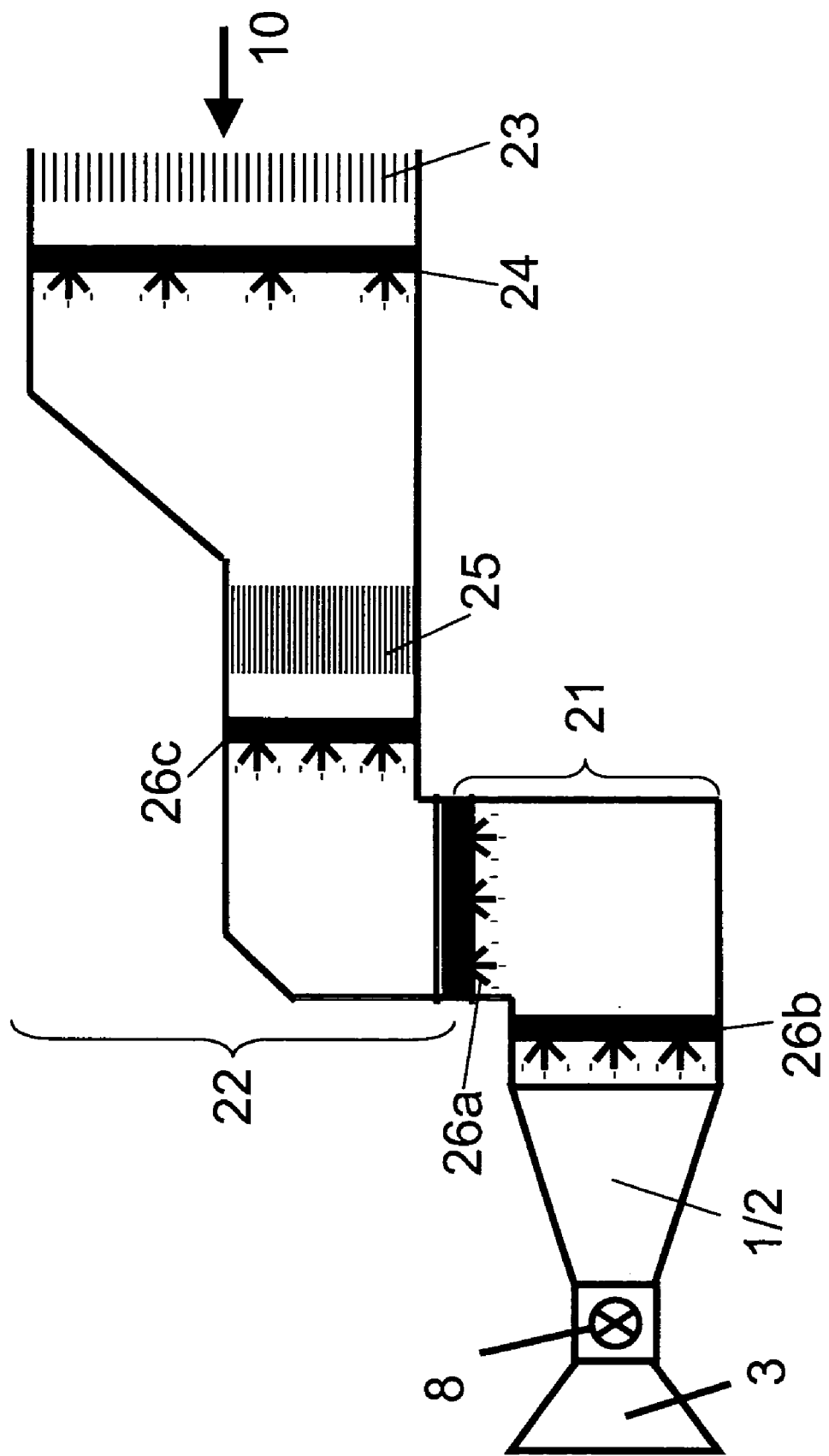
FIG. 2 shows a further schematic representation of a gas turbine plant with its air feed to the compressor.

FIG. 2 shows a schematic representation of the intake air path of a gas turbine plant according to FIG. 1. The intake air 10 is typically passed first of all through a filter 23, a wall provided with air slots or a plate being arranged if need be upstream of this filter. A silencer 25 which is intended to suppress the noise generated during the intake is likewise located in the path of the intake air 10. The fogging devices according to the invention can be attached in such an intake path at different locations. On the one hand, it is possible to attach them, for example, in the form of a cooling unit 24 downstream of the filter 23 and upstream of the silencer 25. Since, of course, such a fogging device itself has sound-absorbing properties, a silencer 25 may in principle also be dispensed with. Alternatively or, additionally, it is possible to arrange such a fogging device downstream of the silencer 25. In this case, on a bent path, as shown in FIG. 2, where there is first of all an intake air duct 22 on a higher level and, after a deflection, an intake air collector 21, such water atomizing grids may be arranged at different locations, either inside the intake air duct 22 directly downstream of the silencer 25, as indicated by the reference numeral 26c, or else directly at the location of the deflection according to reference numeral 26a, or essentially directly upstream of the inlet into the compressor 1/2, as indicated by the reference numeral 26b.

FIG. 3 shows, by way of example, how a fogging device 26 according to the invention, which at the same time also has a sound-absorbing effect, can be actually constructed. In this case, the fogging device 26 comprises tubular elements, which in FIG. 3 are designed as Venturi tubes 31. In other words, the elements 31 are not cylindrical elements but rather tubes which have a constriction in the center region. The flow velocity in this region of the constriction is in this case substantially higher than at the inlet or at the outlet from the tubes. The individual Venturi tubes 31 are arranged in parallel side by side in the direction of flow of the intake air. The individual Venturi tubes 31 may have a circular cross section, as indicated in FIG. 3b, but it is also possible, in order to permit as tight a packing as possible, to design the individual elements with a polygonal cross section, e.g. as a hexagon, so that a honeycomb-like arrangement, in which the intermediate spaces turn out to be as small as possible, can be realized. As can be seen in FIG. 3a, the supporting structure of such a device is realized by at least two walls 34. The water 29 can be fed in a simple manner between the two walls 34, which are arranged parallel to one another and perpendicularly to the air flow. The two walls 34 have corresponding holes into which the Venturi tubes 31 are admitted or welded in place. The intake air 27 enters the individual elements, and, due to the constriction of the cross section, the flow velocity increases in the region of this constriction. Individual nozzles 33, through which the fed water 29 is sprayed into the air flow flowing at high velocity, are arranged on the circumference in the region of the constriction. As can be seen in FIG. 3b, 6 nozzles, for example, are arranged on the circumference. In this case, the nozzles are preferably selected in such a way that droplets of a size within the range of 1 to 50 µm form. The droplet formation is further assisted by the specific flow inside the Venturi tube 31 at the narrowest location. Accordingly, wetted air 28 discharges downstream of the fogging device 26. Cavities 35 form in the intermediate space between the individual Venturi tubes 31. These cavities may be filled with appropriate materials in order to further assist the sound-absorbing effect. Special foamed materials, for example, are suitable for this purpose. Furthermore, the sound-absorbing effect can be assisted by appropriate coatings known from the field of construction of silencers of conventional type.

Figure 4:
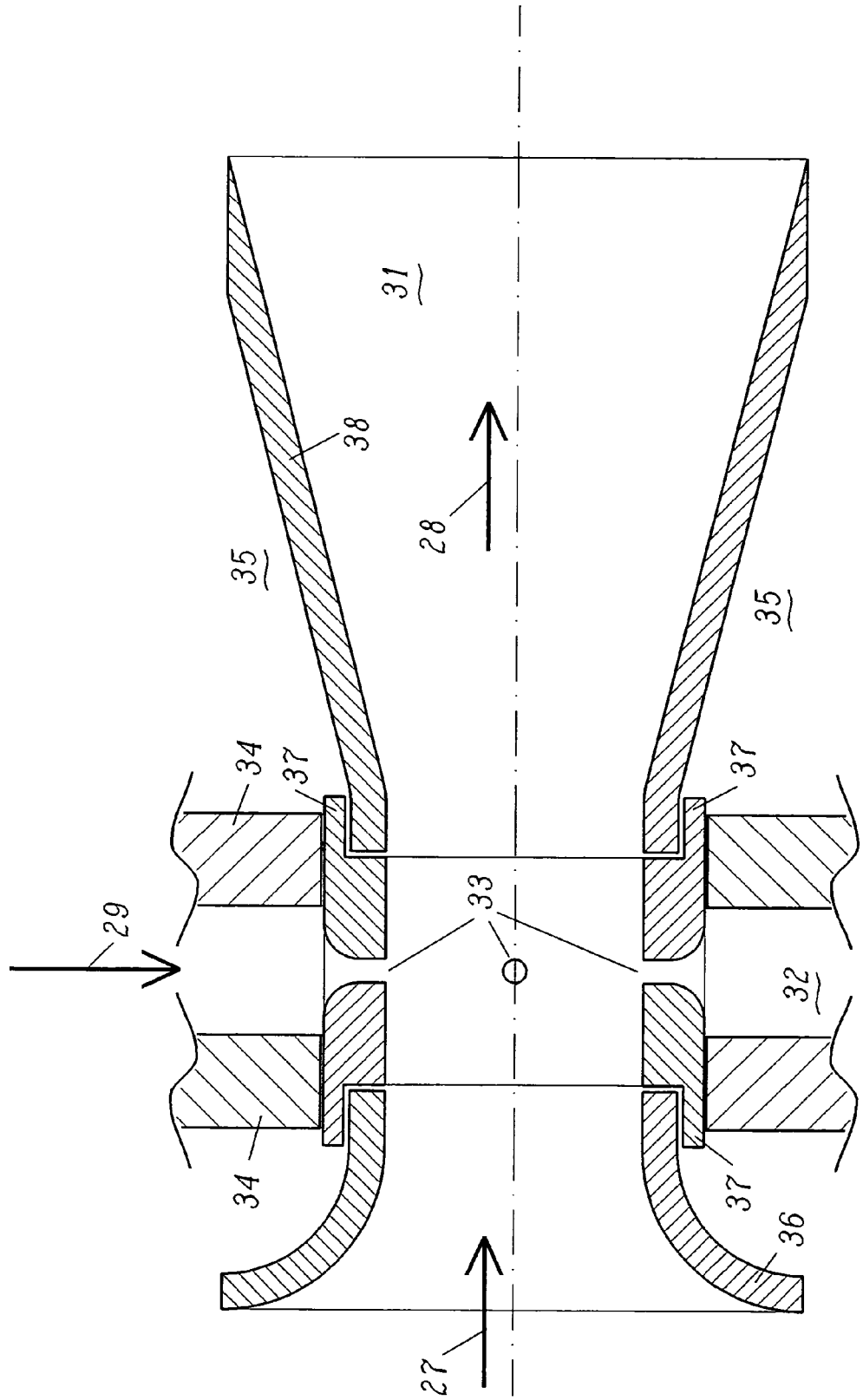
FIG. 4 shows a detailed partial section through an individual Venturi element of a fogging device.

FIG. 4 shows a further exemplary embodiment of a specific type of construction of such a Venturi tube 31. To form a complete fogging device, such Venturi tubes 31 are arranged next to one another in as tight a packing as possible. The Venturi tube 31 in this case is composed of individual elements in order to simplify the construction. Located on the inflow side is an inlet element 36 which is designed, as it were, in a trumpet shape. In its constricted region, the tube 31 has a cylindrical section which is formed by a ring element 37. In this case, this ring element 37 has 4 holes which are distributed over its circumference and act as nozzles 33., Arranged downstream of this ring element 37 is an outlet element 38, which expands the cross section of flow essentially to the cross section of flow at the inlet into the element 36 and acts as a diffuser.

This design permits a simple construction of such a fogging device, since through-holes at an appropriate distance apart simply have to be provided in the two side walls 34 between which the water 29 is fed. The ring elements 37, which have the openings 33 to be produced in a precise manner, can then be inserted into these holes and welded to the walls 34. Alternatively, it is possible to provide the holes with an internal thread and to provide the ring elements 37 with a corresponding external thread, so that the ring elements 37 can simply be screwed into the holes. On the inflow side, the inlet elements 36 are then inserted into corresponding step-shaped widened portions provided in the ring element 37, so that the inner wall of the tube 31 produced is as smooth as possible. The elements 36 may in turn either be welded or screwed to the ring element 37. Similarly, the outlet elements 38 are let into corresponding widened portions of the ring element 37 from the side facing away from the flow and are firmly connected to said ring element 37.

Such Venturi tubes 31 typically have a diameter at the inlet or outlet within the range of 20 to 100 mm and a diameter in the constricted region of 30 to 60 mm. The ratio between diameters at the inlet and the narrowest point should not normally be greater than 2, so that the flow resistance occurring in the in take path due to the constriction and the efficiency losses associated therewith do not become too great.

Obviously, numerous modifications and variations of the present invention are possible in light of the above teachings. It is therefore to be understood that, within the scope of the appended claims, the invention may be practiced otherwise than as specifically described herein.

LIST OF DESIGNATIONS

| | |
|---|---|
| 1 | First compressor stage (low pressure) |
| 2 | Second compressor stage (high pressure) |
| 3 | Gas turbine |
| 4 | Steam turbine |
| 5 | Generator |
| 6 | Shaft |
| 7 | Coupling |
| 8 | Combustion chamber |
| 9 | Fuel line, fuel |
| 10 | Intake air |

-continued

LIST OF DESIGNATIONS

| | |
|---|---|
| 11 | Partially compressed intake air |
| 12 | Compressed air |
| 13 | Hot combustion air, hot gas |
| 14 | Exhaust gas |
| 15 | Heat recovery steam generator |
| 16 | Chimney |
| 17 | Line to the heat recovery steam generator (water) |
| 18 | Line from the heat recovery steam generator (steam) |
| 19 | Outlet of the steam turbine |
| 20 | Feed of water to the intake air |
| 21 | Intake air collector |
| 22 | Intake air duct |
| 23 | Filter |
| 24 | Cooling unit |
| 25 | Silencer |
| 26 | Water atomizing grid |
| 27 | Intake air upstream of the atomizing grid |
| 28 | Wetted air downstream of the atomizing grid |
| 29 | Fed water |
| 30 | Side wall of 21 or 22 |
| 31 | Venturi tube |
| 32 | Duct for 29 |
| 33 | Nozzles |
| 34 | Side walls of 32 |
| 35 | Cavities between 31 |
| 36 | Inlet element of 31 |
| 37 | Ring elements |
| 38 | Outlet element of 31 |

What is claimed as new and desired to be secured by Letters Patent of the United States is:

1. A fogging device for introducing water, vapour, or both, into an intake air flow of a gas turbine, the fogging device comprising:
sound-absorbing means including a plurality of tubular elements arranged essentially parallel to the direction of flow of the intake air flow;
wherein each tubular element includes an interior space; and
nozzles configured and arranged to introduce water, vapour, or both, into the intake air flow, the nozzles being arranged on the inside of the tubular elements and oriented for spraying water into the interior space.

2. The fogging device as claimed in claim 1, further comprising cavities between the tubular elements configured and arranged to be sound-absorbing.

3. The fogging device as claimed in claim 1, wherein the tubular elements each have a diameter that changes along their length.

4. The fogging device as claimed in claim 3, wherein the tubular elements each comprise a constriction in a middle region.

5. The fogging device as claimed in claim 4, wherein each tubular element includes an inlet side and an outlet side, and wherein the constriction is configured and arranged so that the elements have essentially the same diameter on the inlet side and on the outlet side and have a diameter smaller by 20 to 30% in the middle region.

6. The fogging device as claimed claim 1, wherein the tubular elements each have a diameter that changes along their length and includes a constriction in a middle section, and wherein the nozzles are arranged in the region of the constriction.

7. The fogging device as claimed in claim 6, wherein each element includes an inlet side and an outlet side, and wherein the constriction is configured and arranged so that the elements have essentiall the same diameter on the inlet side and on the outlet side and have a diameter smaller by 20 to 30% in the middle region.

8. The fogging device as claimed in claim 1, further comprising:
   means for spraying water having a droplet size within the range of 10 to 50 μm into the intake air flow, said means comprising said nozzles.

9. A method of increasing or regulating the power output of a gas turbine comprising:
   providing said gas turbine with a fogging device as claimed in claim 1; and
   operating said fogging device to increase or regulate the power output of said gas turbine.

10. The method as claimed in claim 9, further comprising:
    spraying water with the fogging device into the intake air flow essentially directly upstream of a first compressor stage, of a second compressor stage, or both, and optionally downstream of a further fogging device.

11. The fogging device as claimed in claim 1, further comprising:
    at least two nozzles circumferentially distributed for each tubular element.

12. A fogging device for introducing water, vapour, or both, into an intake air flow of a gas turbine, the fogging device comprising:
    sound-absorbing means including a plurality of tubular elements arranged essentially parallel to the direction of flow of the intake air flow; and
    at least two supporting walls arranged essentiall perpendicularly to the direction of flow of the intake air flow, between which at least two supporting walls the water, vapour, or both is to be fed and into which at least two supporting walls the tubular elements are admitted so that the tubular elements pass through the at least two supporting walls.

* * * * *